United States Patent [19]

Sperber

[11] Patent Number: 5,389,167

[45] Date of Patent: Feb. 14, 1995

[54] METHOD FOR INSULATING A CAVITY

[76] Inventor: Henry Sperber, 8 Red Fox La., Engelwood, Colo. 80111

[21] Appl. No.: 76,258

[22] Filed: Jun. 11, 1993

Related U.S. Application Data

[63] Continuation-in-part of Ser. No. 49,569, Apr. 19, 1993, and a continuation-in-part of Ser. No. 875,623, Apr. 28, 1992, abandoned.

[51] Int. Cl.6 .............................................. E04B 2/00
[52] U.S. Cl. ...................................... 156/71; 156/77; 156/78; 156/291; 156/293; 156/295; 52/743
[58] Field of Search ............... 156/71, 78, 293, 77, 156/290, 291, 295; 52/404, 407, 743

[56] References Cited

U.S. PATENT DOCUMENTS

| | | |
|---|---|---|
| 3,258,889 | 7/1966 | Butcher . |
| 3,729,879 | 5/1973 | Franklin ........................... 52/404 |
| 3,785,913 | 1/1974 | Hallamore ...................... 156/71 X |
| 4,471,591 | 9/1984 | Jamison . |
| 4,658,555 | 4/1987 | Steiner . |
| 4,681,788 | 7/1987 | Barito et al. ................. 156/303.1 X |
| 4,768,710 | 8/1988 | Sperber . |
| 4,952,441 | 8/1990 | Bose et al. ..................... 52/404 X |

*Primary Examiner*—Jeff H. Aftergut
*Attorney, Agent, or Firm*—Sheridan Ross & McIntosh

[57] ABSTRACT

A method and apparatus for simultaneously insulating cavity portions and securing batt insulation in the cavity to be insulated. The present invention provides a system for using a mixture of insulating material, a dissipating foam, and an adhesive to hold the batt insulation in a frame that defines a cavity to be insulated. In one embodiment the mixture is applied only to the border of the cavity. In another embodiment the insulating material comprises fly ash particles.

20 Claims, 13 Drawing Sheets

METHOD FOR INSULATING A CAVITY

RELATED APPLICATIONS

The present application is a continuation-in-part of pending U.S. patent application Ser. Nos. 08/49,569, filed Apr. 19, 1993, pending, and 07/875,623 filed Apr. 28, 1992, now abandoned.

FIELD OF THE INVENTION

The present invention relates to the use of both batt insulation and a dissipating foam insulation mixture in a cavity to be insulated.

BACKGROUND OF THE INVENTION

In order to conserve energy, an increasing number of homeowners and building contractors are installing insulation throughout their buildings. In many cases the area to be insulated is a cavity in a wall, roof or floor of the building. One type of insulation often used for such cavities is blown-in insulation. Blown-in insulation comprises an insulating material which can be injected into a cavity via air-pressure. A number of different products have been used in the past to fabricate blown-in insulation (i.e. cellulose fiber, fiberglass, rockwool, etc.).

The level of insulation required (the R-value), and therefore the type and amount of insulation used, is dependent on the characteristics of the specific area to be insulated. Insulation manufacturers are constantly searching for low cost materials which exhibit sufficient insulating properties and can be provided into a form suitable for blowing into a cavity. Logically, a less expensive insulating material, which can be used for an application requiring a given R-value, is more desirable.

Fly ash is a coal byproduct which occurs as spherical particles usually ranging in diameter from 0.5 to 100 microns. Depending on the specific makeup of the coal used, when coal is burned, fly ash makes up anywhere from 10 to 85% of the coal ash residue. Up to 20% of fly ash consists of cenospheres, which are lightweight spheres of silicate glass filled with nitrogen and carbon dioxide that float in water. This makes pond disposal of coal ash very difficult as the cenospheres are apt to create a suspended solids problem in the pond. Also, there are significant environmental restrictions and costs associated with other forms of disposal. Therefore, power plants and other producers of fly ash are extremely willing to sell large quantities of fly ash at a relatively modest price (a considerably lower price than an equal volume of standard insulating materials).

Thus, it would be advantageous to use fly ash as an insulating material due to its availability and low cost. In addition, creating insulating material from fly ash provides a productive use for an ordinarily undesirable byproduct.

Another type of insulation commonly used to insulate cavities in buildings is batt-type insulation. Batt insulation normally comprises blocks of packaged insulation having predetermined dimensions dependent on the size of the cavity to be insulated. As shown in FIGS. 1 and 2, the packaging surrounding a block of batt insulation 300 is typically made large enough that flaps 304 having a narrow width are provided around the perimeter of a block 300 for fastening purposes. It is commonplace to use fasteners such as staples 308 to attach the flaps 304 to the frame 316 of a cavity to be insulated, thereby securing the batt block 300 in place. Note, while FIG. 1 illustrates flaps 304 being attached to the back panel of frame 316, flaps 304 may alternatively be attached to the side walls of frame 316.

One of the problems with this method of securing batt insulation in a cavity is that gaps 312 may be left between the frame 316 and the insulation block 300 in order to provide a surface on the frame to which the flaps 304 may be fastened. Such gaps 312 of uninsulated space tend to lessen the overall insulating effectiveness of the batt insulation 300.

Thus, it would be advantageous to provide a method and apparatus for attaching batt insulation to a frame defining a cavity to be insulated which does not leave gaps of uninsulated space in the cavity which lessen the insulating effectiveness of the batt insulation while simultaneously providing a means for securing the batt insulation in place.

SUMMARY OF THE INVENTION

Accordingly, one object of the present invention is to provide an improved system for securing batt insulation in a cavity to be insulated.

Another object of the present invention is to provide a system for securing batt insulation in a cavity to be insulated using a fastener having independent insulating properties.

Still another object of the present invention is to provide a system for securing batt insulation in a cavity to be insulated using a fastener comprising insulating material, an adhesive, and a dissipating foam.

Yet another object of the present invention is to provide a means for applying a fastener comprising insulating material, an adhesive, and a dissipating foam to secure batt insulation in a cavity.

The present invention provides a method and apparatus for insulating and simultaneously holding batt insulation in place. A mixture of loose insulation, dissipating foam and adhesive is introduced to a frame forming a cavity to be insulated. Batt insulation is subsequently positioned in the cavity so as to be in contact with the mixture. As the foam in the mixture dissipates and the adhesive dries, the loose insulation material is bonded together and to the frame to form a lattice of insulating material which is secured to the frame. Simultaneously, the adhesive bonds the batt insulation to portions of the loose insulation thereby holding the batt insulation in the cavity. The batt insulation is thus held in the cavity via a fastener with independent insulating qualities, thereby obviating the problem of uninsulated gaps associated with prior art fastening systems.

In one embodiment of the present invention, the mixture of loose insulation, dissipating foam, and adhesive is applied only to the border of the frame forming the cavity. In another embodiment, the mixture is sprayed along the border to enhance the adhering qualities of the foamed insulation particles. In still another embodiment of the present invention, the loose insulating material comprises fly ash particles.

DETAILED DESCRIPTION

Figure 3:
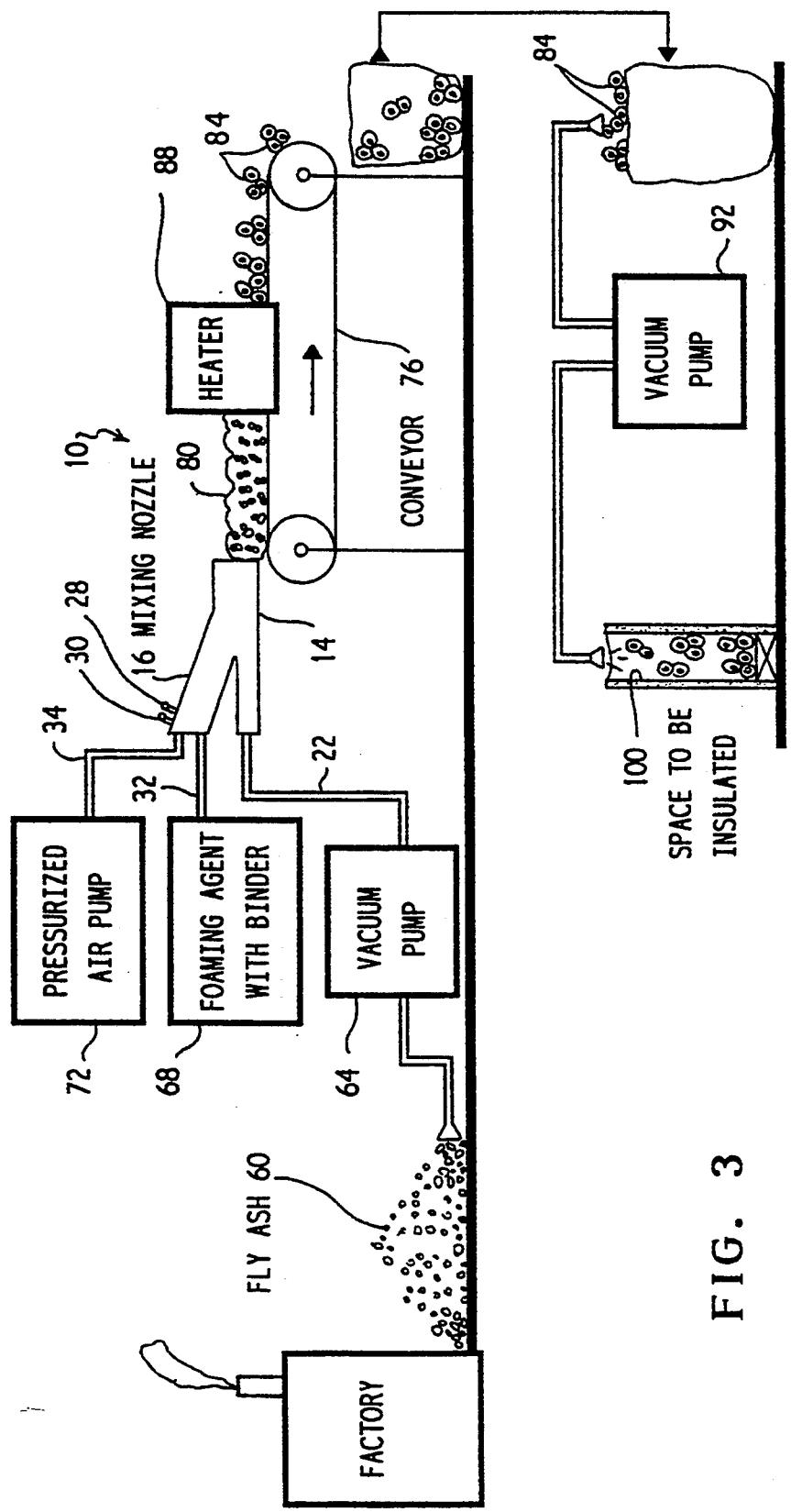
FIG. 3 illustrates the production and use of fly ash insulation according to one embodiment of the present invention.

The process by which one embodiment of the fly ash insulation of the present invention is made and installed is illustrated in FIG. 3. Fly ash 60 may be produced as a byproduct of coal burned at a factory. Fly ash can be defined as finely divided residue that results from the combustion of ground or powdered coal. In comparison, coal fly ash has a density of about 32 times greater than that of cellulose fiber insulation; about 32 times greater than certain fiberglass insulation, about 16 times greater than rockwool insulation and about 3-½ times greater than wood ash.

In this embodiment the fly ash insulation is manufactured at the factory so as to eliminate the need for transport of the fly ash 60. A vacuum pump 64 is provided to feed fly ash 60 to conduit 14 of mixing nozzle 10. Mixing nozzle 10 is also connected to a supply of foaming agent including a binder 68 and a pressurized air pump 72 via lines 32 and 34, respectively.

Figure 4:
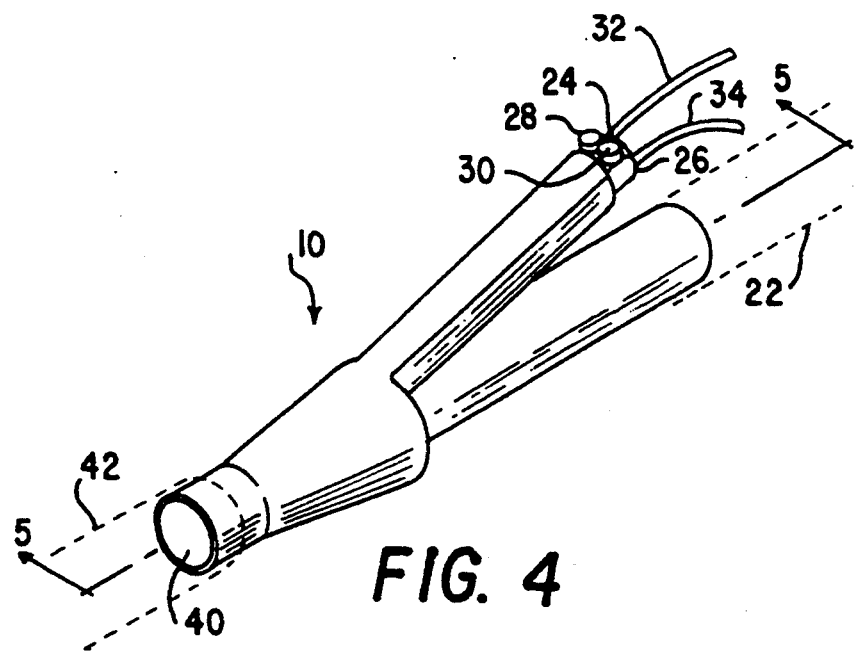
FIG. 4 illustrates a mixing nozzle which is used in conjunction with one embodiment of the present invention.
Figure 5:
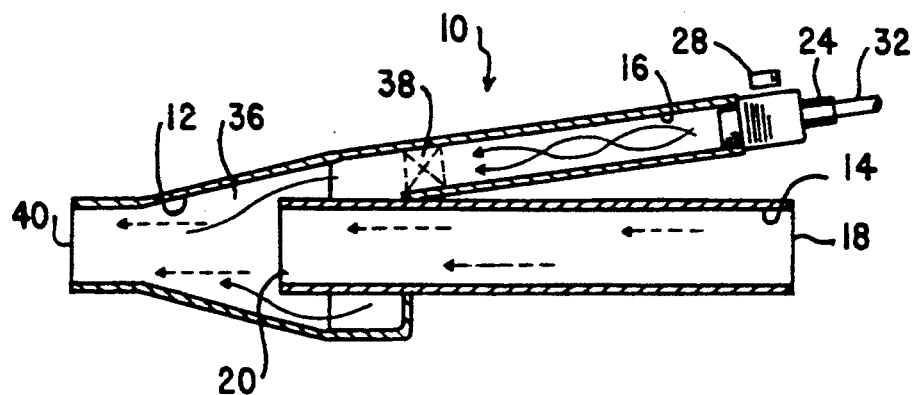
FIG. 5 illustrates a cross-sectional view of the mixing nozzle of FIG. 4.

The manner of using the nozzle 10 and of production and placement of insulating material will now be described with reference to FIG. 3-5. A foaming agent is introduced through the first line 32 and through the first entrance port 24 into the second conduit 16, with the rate of flow being controlled by the first valve 28. Any of a number of foaming materials well known in the art can be used. A pressurized gas, such as air, is introduced through the second line 34 and through the second entrance port 26 at a rate controlled by the second valve 30. Inside the first conduit 16, the pressurized air mixes with the foaming agent for use in producing a foam which moves through the second conduit 16. The baffle or obstacle 38 can be used to assist in producing foam. The foaming material in its foamed state moves through the exit port 36 of the second conduit 16 and into the mixing chamber 12.

Substantially dry, lofted fly ash particles which have been lofted by mixing with pressurized air from vacuum pump 64 are introduced through entrance port 18 into the first conduit 14. The lofted fly ash particles and pressurized air move through the first conduit 14 and through the exit port 20 of the first conduit 14 into the mixing chamber 12.

In the mixing chamber 12, the foaming agent in its foamed state mixes with the lofted fly ash and is forced by the pressurized air entering the nozzle 10 through the exit port 40 of the nozzle 10 and away from the nozzle 10. The tapered area of the second conduit 16 assists in preventing back flow of material into the conduits, particularly the second conduit 16. Such back flow can occur, for example, when flow of insulation material through the nozzle 10 is stopped. If flow of the fly ash particles and foamed material were permitted back into the second conduit 16, it would be necessary for the operator to frequently clean out or unplug the conduit 16 whenever flow of the materials is stopped by the operator for some reason, such as moving the apparatus to a new cavity for filling with the insulation.

An amount of adhesive material can be included in the foam material, for example, by introduction through the first line 32, mixed with the foaming agent. Any adhesive material capable of adhesion to the fly ash particles can be used provided it does not interfere with the foaming process. For example, foamable adhesives such as polyvinyl acetate, ethylvinyl acetate, animal glues and the like can be used. The adhesive material is preferably provided in sufficient quantity that it is capable of maintaining the loft or desired separation (spread) of the fly ash particles after it has cured or set. The adhesive material preferably has a curing or setting time sufficiently short that it cures or sets before substantial drying or dissipation of the foam.

Mixing nozzle 10 outputs the mixture 80 of foam, fly ash, and binder onto conveyor 76 for drying. The foam acts to spread the binder and coat the individual fly ash particles. Ideally, the binder covers substantially all of the spherical outer surface of each fly ash particle. The fly ash particles begin to bind as they are mixed in the nozzle 10 and output onto conveyor 76. When the mixture 80 is dried by heater 88, the foam dissipates and irregularly shaped clusters 84 of a plurality of fly ash particles are formed, which are inter-connected by the binder. The clusters of fly ash particles 84 are then packaged to be used as blown-in insulating material.

Depending on the size and speed of conveyor 76, the type of foaming agent and binder used, and the ambient conditions in which this procedure is performed, heater 88 may be eliminated. Without heater 88, a sufficient amount of time must be accorded for the foam to dissipate and the binder to dry in ambient conditions before packaging. Regardless of whether a heater or ambient air is utilized in connection with the drying state, it is critical that there be sufficient drying of the fly ash particles such that the fly ash particles remain in the separated state caused by the lofting and foam/binder. If sufficient drying does not occur, the clusters will tend to collapse and the necessary separation and insulting attributes will be lost. The degree of drying depends upon the type of fly ash, including the density thereof, and the binder employed.

The packaged fly ash insulating material 84 is transported to the site of the space to be insulated 100. Vacuum pump 92 is then used to blow the fly ash insulating material into space 100. Alternatively, a standard insulation feeding apparatus such as the one disclosed in U.S. Pat. No. 4,978,252 to the present inventor may be used in place of vacuum pump 92.

It is important to note that fly ash in its natural form would not be an effective insulator. Fly ash particles are so small, that a volume of fly ash particles alone used to fill a space to be insulated would be too dense to allow the air pockets necessary for effective insulation. The presently described process of forming irregularly shaped clusters of fly ash particles makes fly ash insulation possible without requiring the foam to harden.

It is recognized that the step of packaging the insulating material and transporting it to the job site may be eliminated. Fly ash 60 may be transported to the site of the space to be insulated. In this embodiment, the foamed mixture 80 is blown directly into space 100 through nozzle 10. Mixture 80 is allowed to dry within space 100. When the foam dissipates, a lattice of clusters 84 will remain within space 100 to provide insulation.

Further, clusters 84 may be installed at the job site using foam via the same process. In this embodiment, clusters 84 are fed to conduit 14 of nozzle 10 where they are mixed with foam containing binder from supply apparatus 68. Again, the mixture is blown directly into space 100. Upon dissipation of the foam, a lattice of larger clusters of fly ash and binder are formed to insulate space 100.

It is also recognized that in other embodiments of the present invention, mixing nozzle 10 may be eliminated. The fly ash particles 60 may be coated with a dry binder/foaming agent combination and mixed with a liquid such as water. The foamed mixture may then be sufficiently dried to form fly ash clusters and packaged to be used as insulating material.

The nozzle 10 may also be eliminated by locating the fly ash in a container and by providing an outlet tube from the bottom to the top of the container. A hole is formed in the container top. The fly ash is coated with a dry binder and a wetting agent is poured into the container. Air is pumped through the hole and a slurry material results with foam being generated as part of the wetting agent. The slurry is outputted from the outlet tube for subsequent creation of the desired insulation.

Although it is preferred that only fly ash particles be utilized in order to take advantage of their properties for insulating purposes, another embodiment involves the inclusion of other insulation particles such as, for example, cellulose-based insulating particles. Other insulating particles would have a density less than that of fly ash particles and would be mixed with fly ash particles in a desired weight or volume ratio that depends on the density of the fly ash, the density of the other insulating particles and the desired degree of insulation. The other insulating particles including cellulose particles, mix with the fly ash and contribute to the suspension or separation of the fly ash particles in forming the insulation clusters. That is, the fly ash particles are intertwined or intermingled among cellulose particles. Additionally, when cellulose insulating particles are used for this purpose, after grinding them they contain some amount of binder. This residual binder is useful in contributing to subsequent binding of insulation particles in order to achieve the insulating clusters. Consequently, less binder needs to be added, in comparison with not using cellulose insulating particles, in order to create the insulation clusters.

In addition, in a further embodiment, a dry binder may be used to coat individual fly ash particles 60 without a foaming agent. In this embodiment, when a wetting agent, such as a foaming agent including water is later added, the binder is used in creating clusters of fly ash particles. The foaming agent is used to provide the necessary separation of fly ash-particle clusters, during the activation (chemical reaction or other) of the binder in connection with causing the binder to interconnect or bind certain fly ash particles together to form the clusters.

In another embodiment, substantially all of the fly ash particles are individually coated, e.g., using a foaming wetting agent. After coating to form clusters, and subsequent drying or curing, the formed clusters are shaped or ground to form fine particles. These subsequently formed particles can then be packaged into an insulation bag or they could be sprayed into a cavity that is to be insulated.

The fly ash clusters could also be formed into board stock or panels. Such panels can be of a size, for example, of 12 inches × 12 inches × 1 inch. The panels are formed by blowing or otherwise providing the fly ash particles with foam and binder into a form having the desired panel size. The formed panels can then be located in a curing oven to enable the clusters to adhere together. In this embodiment, it may be advantageous to use materials or substances in addition to the fly ash particles for filler purposes, for example. The fly ash, however, acts substantially as the only insulating material and separation of fly ash particles is caused substantially only by the binder not the foam, which dissipates.

With regard to the embodiments in which the fly ash insulation is made at the job site and is installed or injected into the area to be insulated continuous with the making thereof, it may be impractical and not feasible to achieve sufficient drying of the clusters of fly ash particles before unwanted settling or collapsing of the particles occurs. In such a case, the necessary separation of fly ash particles is not achieved and the insulation characteristics are not present. To overcome such an occurrence, a specific binder can be employed that chemically reacts with the foam or other liquid in such a way that the necessary binding occurs rapidly among the fly ash particles and such binding continues without settling or collapsing even as the clusters of fly ash particles are injected into a cavity. Alternatively or concomitantly, less dense insulating particles can be mixed with the fly ash particles. In this case, the overall mixture of insulating particles is less dense such that there is little, or sufficiently reduced, tendency to unwantedly settle or collapse thereby not defeating the insulating properties of the particles. The mixture ratio (fly ash particles to less dense particles) depends upon a number of factors including the density of the fly ash particles, the density of the mixed particles, the binder utilized and the desired insulation.

Figure 6:
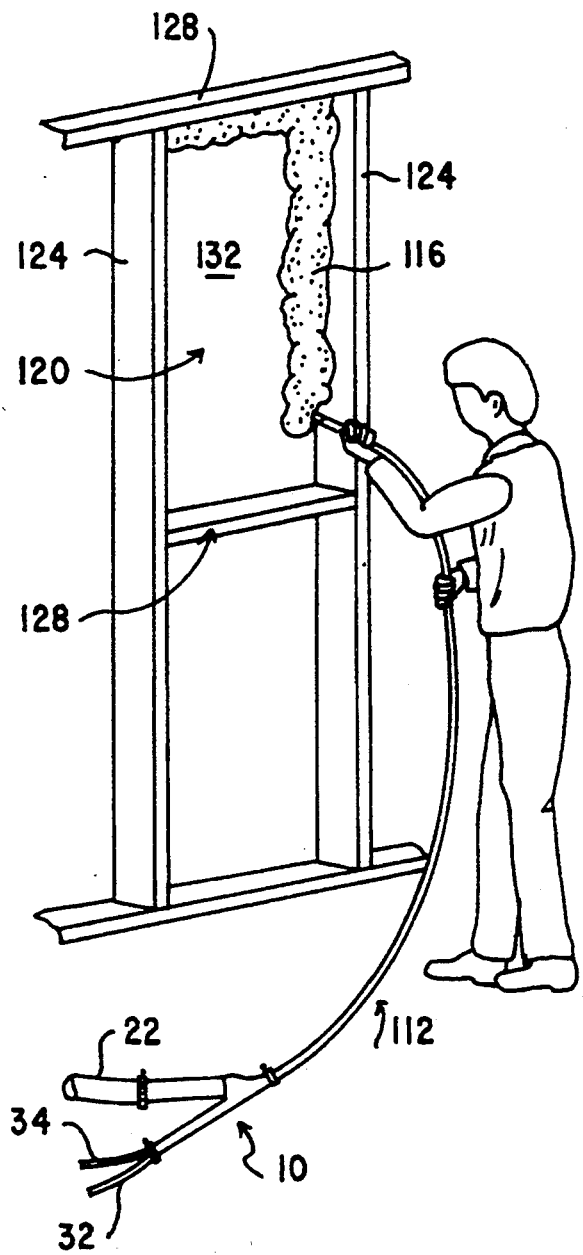
FIG. 6 illustrates a step of applying a foamed insulation mixture to a cavity to be insulated according to one embodiment of the present invention.

In another embodiment of the present invention, a mixture of dissipating foam, loose insulation material, and adhesive is used to simultaneously insulate and secure batt insulation in a cavity. In FIG. 6, an operator installs a foam mixture 116 in a cavity 120 to be insulated. Cavity 120 is formed by vertical studs 124 and horizontal studs 128 along with back panel 132. Foamed mixture 116 is transported via hose 112 from mixing nozzle 10 to cavity 120. Foamed mixture 116 may comprise the fly ash mixture 80 which is produced as previously discussed. However, foam mixture 116 may also comprise a mixture of any loose insulating material, a dissipating foam, and any adhesive capable of adhesion to the particular loose insulation particles employed. Specifically, insulating material such as rock wool, fiberglass, cellulose, wood fiber, or combinations thereof may be used in place of the fly ash particles. In addition, fibrous insulation materials such as these may be introduced through hose 22 to nozzle 10 in a lofted state via a standard fibrous insulation machine as opposed to the vacuum pump 64 disclosed with relation to the fly ash embodiment.

As illustrated in FIG. 6, mixture 116 is preferably supplied only around the border of cavity 120. By supplying the mixture 116 only around the border of cavity 120 as shown, the time and expense of installing insulation (both batt and foamed) is reduced while still providing an effective means for securing batt insulation. Specifically, mixture 116 is supplied around the periphery of back panel 132 at the joints where back panel 132 meets vertical studs 124 and horizontal studs 128. Mixture 116 is preferably supplied to cavity 120 while in its flowable state (i.e. prior to substantial dissipation of the foam in mixture 116). Also, mixture 116 preferably includes an adhesive which will cause the pieces of loose insulation material to begin bonding with each other and with studs 124 and 128 and back panel 132 as soon as the mixture 116 is introduced into cavity 120. This will obviate the need for a restraining means to keep mixture 116 from sliding to the bottom of cavity 120, thereby making the installation process faster and easier.

Figure 7:
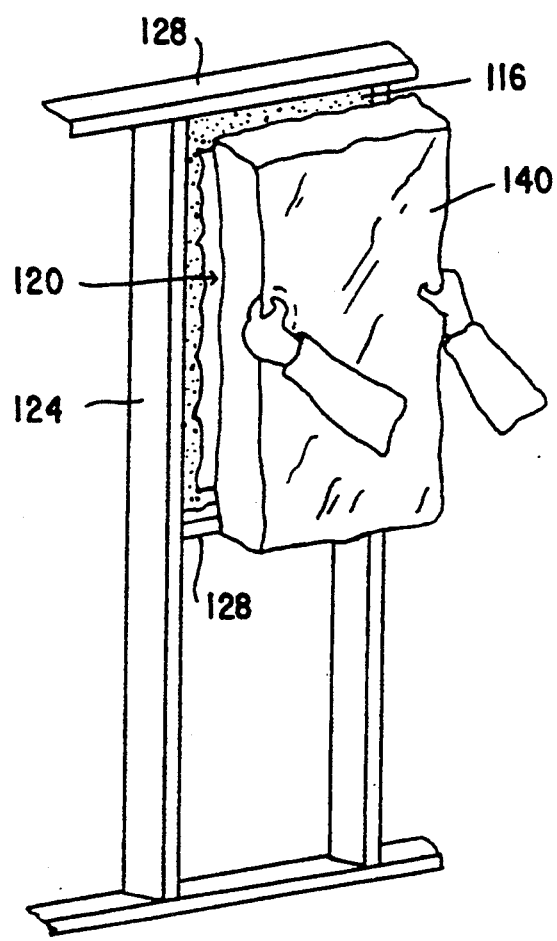
FIG. 7 illustrates how batt insulation is inserted into a cavity to be insulated according to the present invention.
Figure 8:
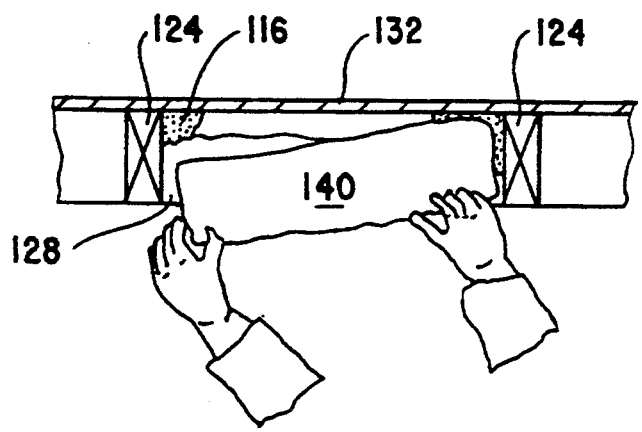
FIG. 8 is a top-view of batt insulation being inserted into a cavity in accordance with one embodiment of the present invention.

FIGS. 7 and 8 illustrate how batt insulation is secured in a cavity according to the present invention. After mixture 116 has been applied to the periphery of cavity 120 and while the mixture is still in its flowable state, a block of batt insulation 140 is lined up to be inserted into cavity 120. As the block of batt insulation 140 is inserted into cavity 120 and forced towards back panel 132, mixture 116 spreads out to be in contact with greater portions of back wall 132 and studs 124 and 128. The adhesive in mixture 116 bonds the walls of batt block 140 to the pieces of loose insulation material in mixture 116, which have already begun to bond to each other, and to the frame forming cavity 120. Preferably, the operator will maintain pressure on batt block 140 until the adhesive in mixture 116 has a chance to bond the batt insulation to the insulation fibers in mixture 116 securely. The adhesive in mixture 116 preferably has a curing or setting time which is less than the time needed for the foam of mixture of 116 to substantially dissipate.

As the adhesive in mixture 116 begins to cure, three types of bonding occur simultaneously. First, the pieces of insulation material in mixture 116 bond to each other, forming a lattice of insulation material pieces. Second, the pieces of insulation material in mixture 116 which are forced into contact with the frame defining cavity 120 (i.e. studs 124 and 128 and back panel 132) bond to the frame. Third, the pieces of insulation material which contact the block of batt insulation 140, bond to the surface of the batt block 140. Thus, once the adhesive in mixture 116 has cured or set batt insulation 140 is bonded, through a lattice of pieces of loose insulating material, to the frame defining cavity 120.

Once batt block 140 is bonded into place, the operator may release pressure on batt insulation 140 and allow the foam of mixture 116 to dissipate. Once the foam of mixture 116 dissipates, only batt insulation 140 and the lattice of loose insulation material are left in cavity 120, held there by the adhesive.

Figure 9:
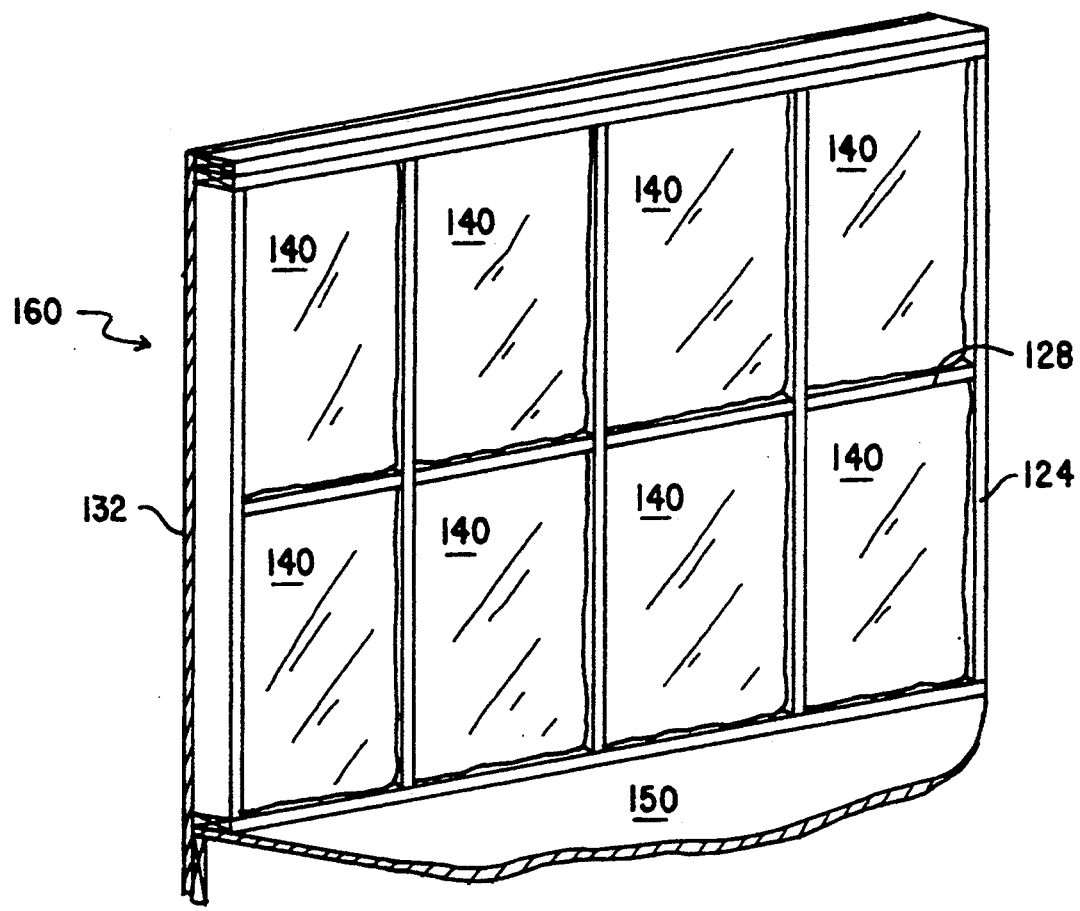
FIG. 9 is an illustration of an entire wall which has been insulated in accordance with one embodiment of the present invention.

As shown in FIG. 9, the aforementioned process may be repeated to insulate and secure batt insulation in a number of cavities which may comprise an entire wall 160.

Figure 10:
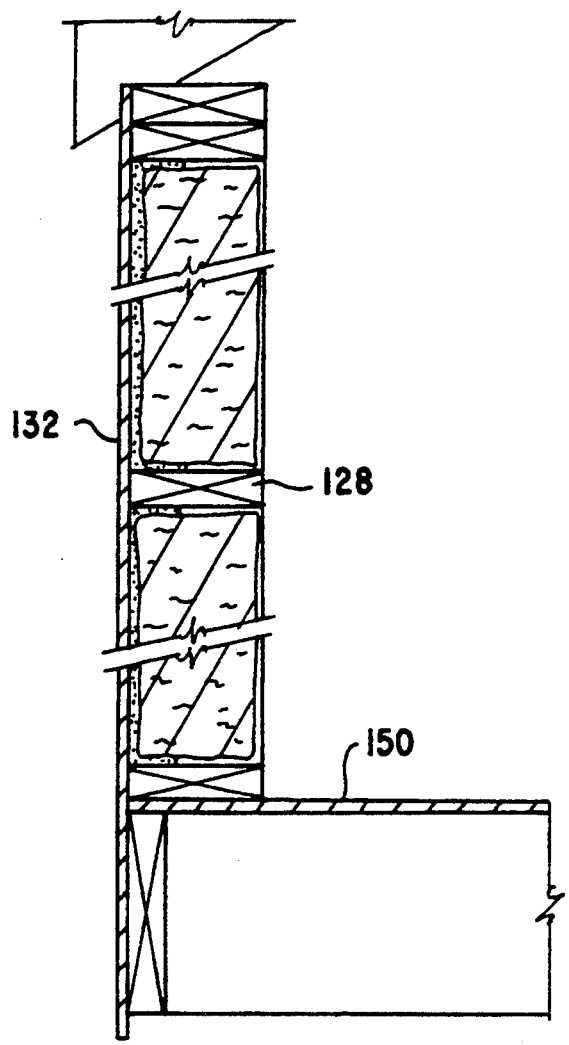
FIG. 10 is a side perspective cut-away view of the wall of FIG. 9 which has been insulated in accordance with one embodiment of the present invention.
Figure 11:
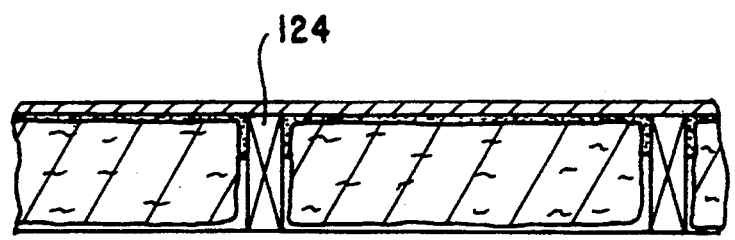
FIG. 11 is a top perspective cut-away view of the wall of FIG. 9 which has been insulated in accordance with one embodiment of the present invention.

FIGS. 10 and 11 illustrate cutaway views of the fully insulated wall pictured in FIG. 9 from the side and above, respectively. Note that mixture 116 has been forced into the space between batt blocks 140 and each of the facades of the wall frame forming the cavities 120. Batt blocks 140 are each secured on five of their six faces to the vertical studs 124, the horizontal studs 128, and back panel 132. Also note that all of the gaps between the frame forming wall 160 and batt blocks 140 are at least partially filled with insulating mixture 116.

Figure 1:
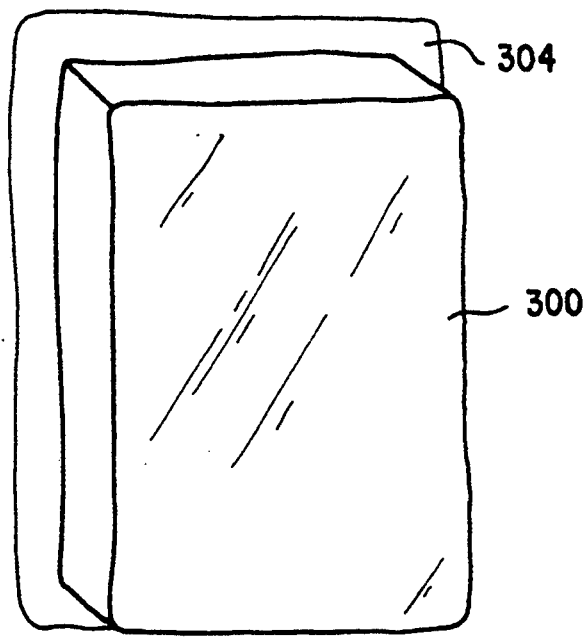
FIG. 1 illustrates a typical block of batt-type insulation of the prior art.
Figure 2:
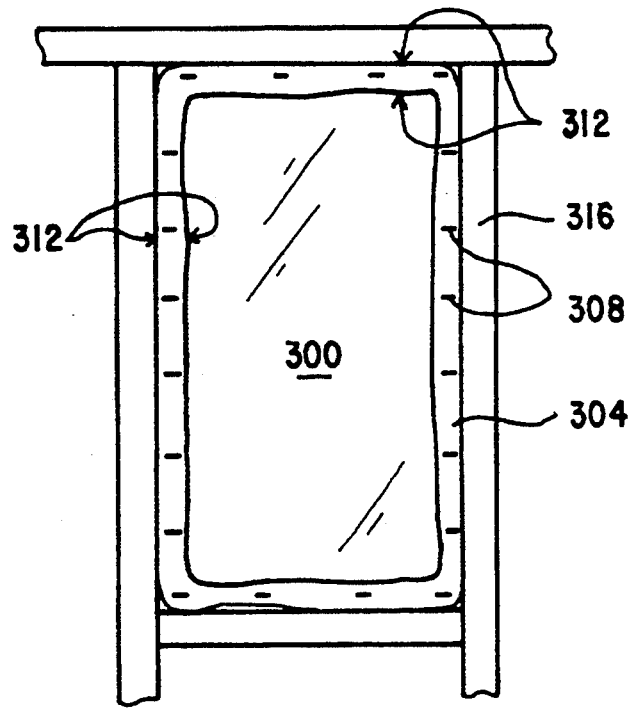
FIG. 2 illustrates a prior art system for securing a block of batt insulation into a cavity to be insulated.

The extent to which the gaps between the frame forming wall 160 and batt blocks 140 must be filled is dependent on the particular insulating requirements of the application for which the present invention is being employed. If necessary, the gaps may be entirely filled by supplying enough of mixture 116 around the periphery of cavities 120, such that when batt blocks 140 are inserted, the mixture will be forced to spread and fill the gaps entirely. However, it has been found that batt blocks 140 may be securely held in cavities 120 without filling the gaps entirely with mixture 116. Also, even if the gaps are only partially filled with insulating mixture 116, a substantial increase in insulating effectiveness for wall 160 may be achieved over conventional fastening means such as the staples 308 illustrated in FIG. 2.

The embodiment just described involves the application of the foamed insulating mixture before placement of the batt in the cavity. It should be appreciated, however, that the foamed insulation mixture, although not preferred, could be applied along the border after the batt is positioned in the cavity.

Figure 12:
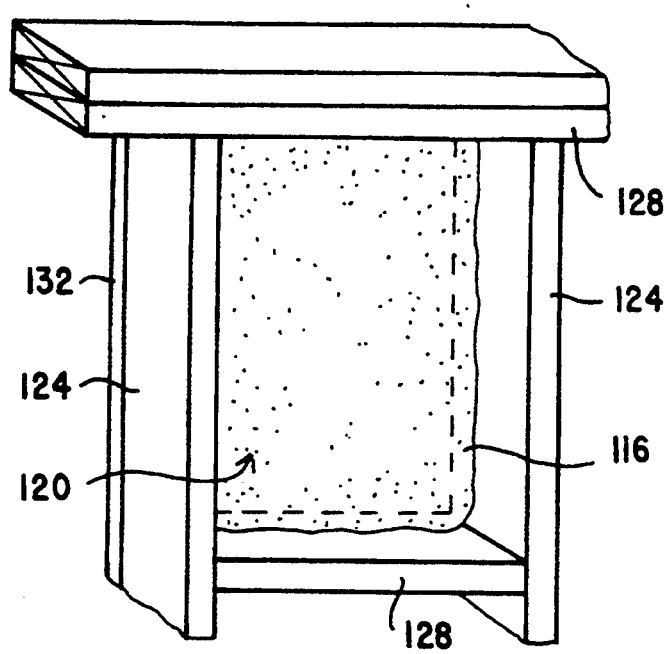
FIG. 12 is a perspective view of a cavity to be insulated after a foamed insulating mixture is applied according to a second embodiment of the present invention.
Figure 13:
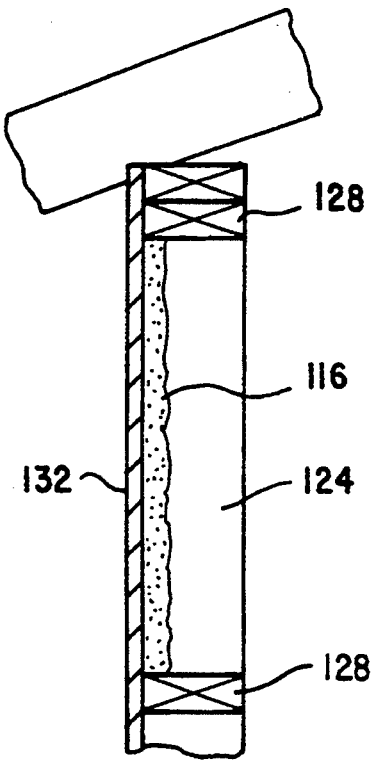
FIG. 13 is a side perspective cut-away view of the cavity to be insulated after the foamed insulating mixture is applied according to the embodiment illustrated in FIG. 12.

FIGS. 12 and 13 illustrate a method for supplying foamed insulation mixture 116 to cavity 120 according to another embodiment of the present invention. As shown, foamed mixture 116 is applied to the entire surface of back panel 132 which is enclosed by studs 124 and 128. Batt insulation 140 (not shown) may again be held in cavity 120 via foamed insulating mixture 116 as described previously. The thickness of the layer of foamed insulating material 116 is approximately uniform and no greater than about half the width of studs 124 and 128. Preferably, the foamed insulating mixture 116 occupies one-fourth or less of the volume of cavity 120. By supplying the foamed insulating mixture 116 to the entire back panel 132, a greater surface is used to connect batt insulation 140 to the frame formed by studs 124 and 128 and back panel 132. Also, this embodiment provides enhanced acoustic insulation by eliminating gaps between batt insulation 140 and back panel 132.

Another embodiment of the present invention relates to a method and structure for insulating surfaces in existing or newly constructed buildings using foamed insulation, which is a mixture of insulation particles and a foamed adhesive material, to form an insulating layer that adheres to the surface, thereby avoiding the need to relatively quickly place the batt insulation in the cavity before the foamed mixture flows away from desired locations, such as along the cavity border, due to gravity. The adherence attribute of the foamed mixture is useful in applications other than with batt insulation.

Figure 14:
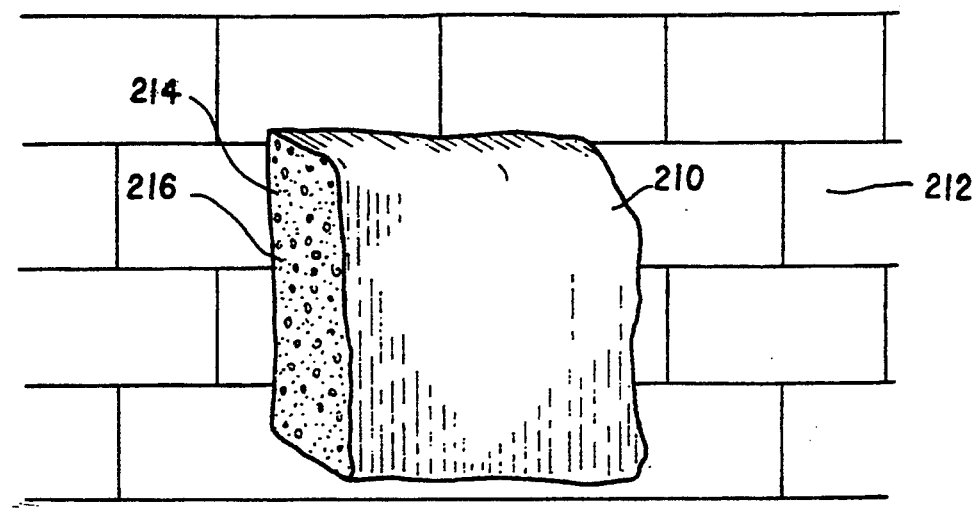
FIG. 14 is a schematic cross-sectional view of a lofted fibers and foamed adhesive insulating mixture applied to a cinder block wall.

In particular, referring to FIG. 14, a layer of foamed fiber insulation 210 of a desired density and thickness adheres to a cinder block wall 212. The foamed fiber insulation 210 is a mixture of a foamed adhesive material 214, which includes a foam and an adhesive material, and insulation particles 216. Suitable foams must be able to maintain the loft or spreading of the insulation particles 216 during and after application. Presently known foams that are capable of this include detergents. The adhesive material may be any foamable adhesive such as polyvinyl acetate, ethylvinyl acetate, animal glues, bentonite based adhesives, plaster and the like. The insulation particles 216 may be any insulating particle known in the art including rock wool, fiberglass, cellulose, wood fiber, or combinations thereof.

The above components are mixed and then applied while in a flowable state to the cinder block wall 212 by any suitable technique. The foamed fiber insulation 210 can be applied by virtually any method that brings the foamed fiber insulation mixture into contact with the desired surface, such as spraying or troweling. A temporary or permanent retaining means may be employed but is not required as the mixture will readily adhere to and maintain its desired shape. The mixture can also be applied to any surface, however oriented, whether the surface is wood, metal, masonry, concrete, stucco, urethane, or the like. Accordingly, the mixture may be readily applied to ceilings, interior walls, floors, attics, exterior walls, roofs and other surfaces, having substantially any orientation. Many other surfaces can also be insulated. For example, the bulkhead of a ship can be insulated to prevent condensation. Further, the flowability of the mixture enables it to insulate void spaces, such as those surrounding pipe cases, wiring and air ducts, and electrical boxes, many of which are hard to reach or difficult to insulate with other methods.

The foamed fiber insulation can also be applied to a surface and then separated from the surface before it cures. Afterwards, when the layer of foamed fiber insulation has cured, it can then be attached to the original surface or to another surface of substantially the same shape as the original surface. In this manner, insulation can be created for surfaces before the surfaces are in place in a structure or for surfaces remotely located from the foamed fiber insulation. For example, insulation can be created for piping that has not yet been installed in a building or, if the piping has been installed, the insulation can be constructed remotely from the building site.

Figure 15:
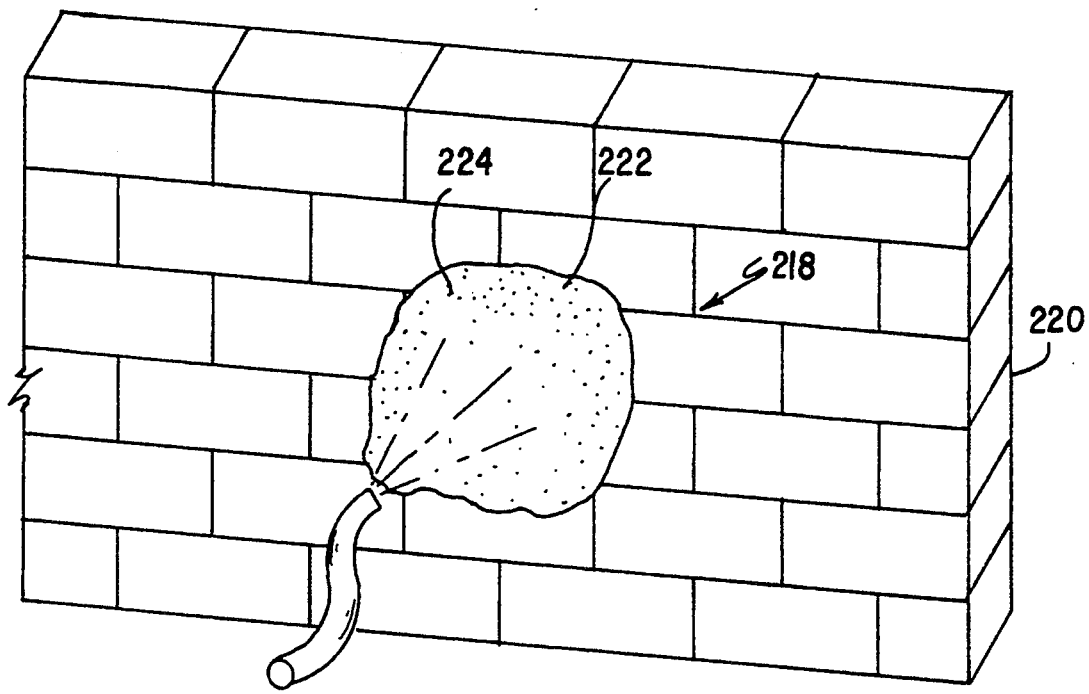
FIG. 15 is a schematic cross-sectional view of the lofted fibers and foamed adhesive insulating mixture sprayed on a cinder block wall.
Figure 16:
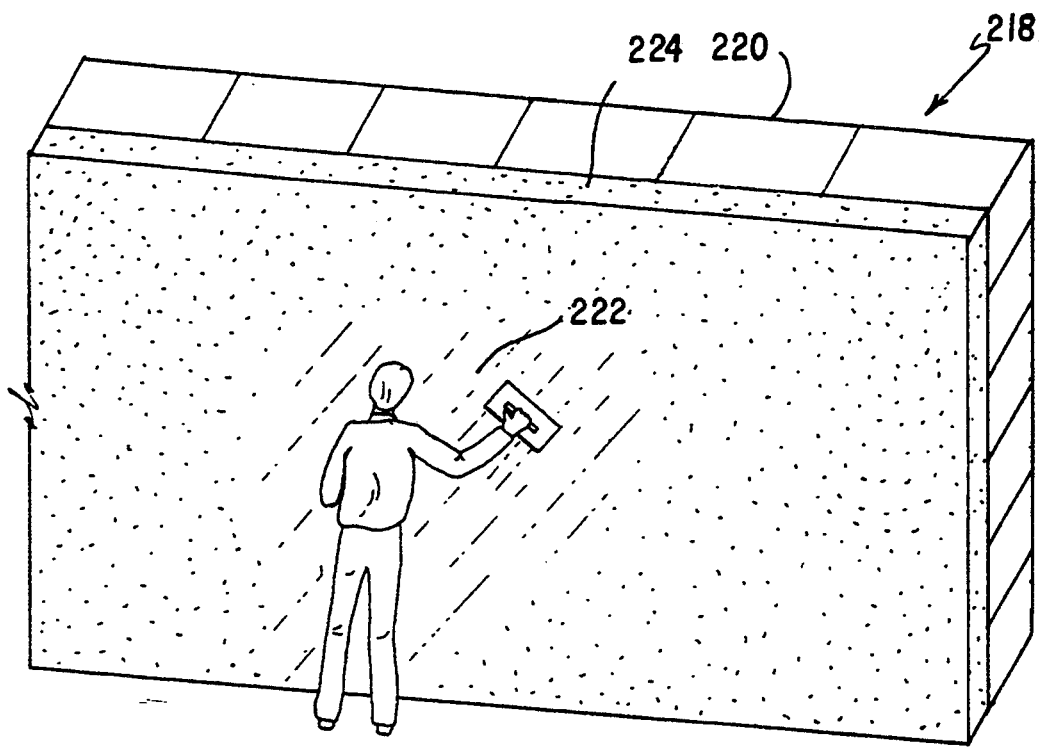
FIG. 16 is a schematic cross-sectional view of the lofted fibers and foamed adhesive insulating mixture being contoured with a trowel, after application on a cinder block wall.

Referring to FIGS. 15 and 16, the ability of the mixture to form an insulation layer of desired shape and texture is illustrated. In FIG. 15, the foamed fiber insulation 218 is sprayed onto a cinder block wall 220 to a desired thickness. While still in the flowable state, the layer of foamed fiber insulation 218 is molded into a desired shape and texture by troweling and rolling. For example, when the foamed fiber insulation is applied to a flat roof, it can be molded so that it has a shape which promotes drainage. As the material is molded, the foamed adhesive material 222 rises to the surface to form a smooth surface with few exposed insulation particles 224. When cured, the foamed fiber insulation 218 retains the desired shape and thickness and the exposed layer of adhesive material 222 forms a protective coating over the insulation particles 224.

The moisture in the foamed fiber insulation 218 cures in the ambient atmosphere, without the necessity of heating or other drying procedures. The cure rate is inversely proportional to the moisture content of the foamed fiber insulation 218, which is typically about 16% to 18% and primarily attributable to the amount of adhesive material employed. When cured, the foam dissipates leaving a substantially rigid layer of insulation particles 224 encapsulated in the adhesive material 222. The adhesive material 222 maintains the loft or separation of insulation particles even after the foam has dissipated. The cured layer has a substantially homogeneous density of insulation particles 224 so as to provide a uniformity of insulation.

Figure 17:
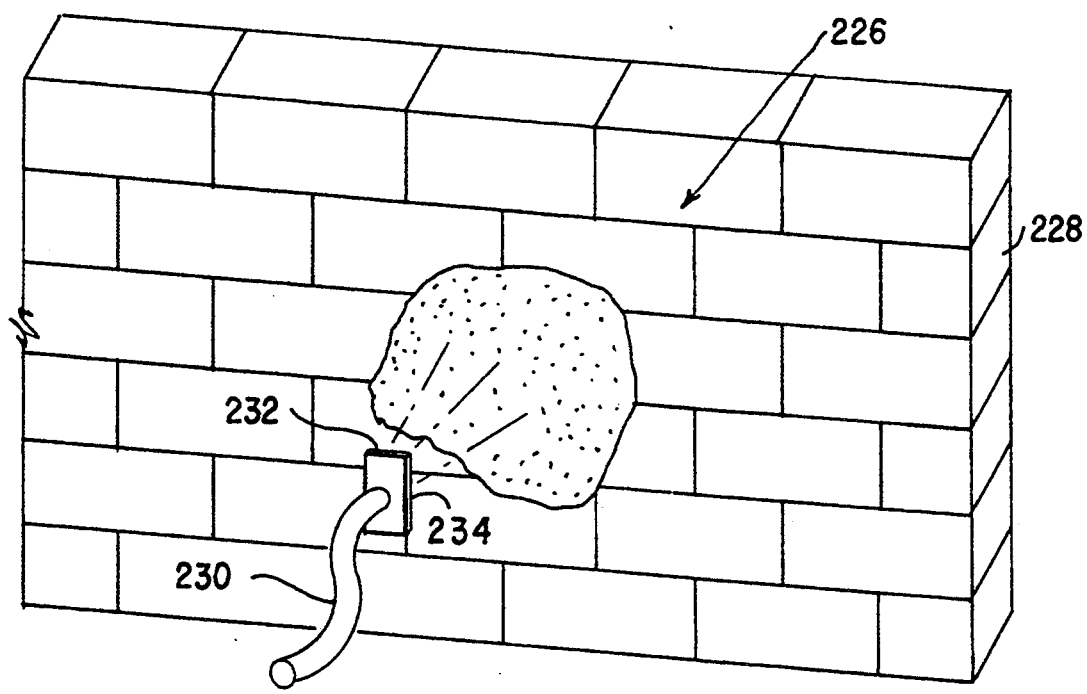
FIG. 17 is a schematic cross-sectional view of the lofted fibers and foamed adhesive insulating mixture sprayed on a cinder block wall using a second spraying hose equipped with a troweling plate.
Figure 18:
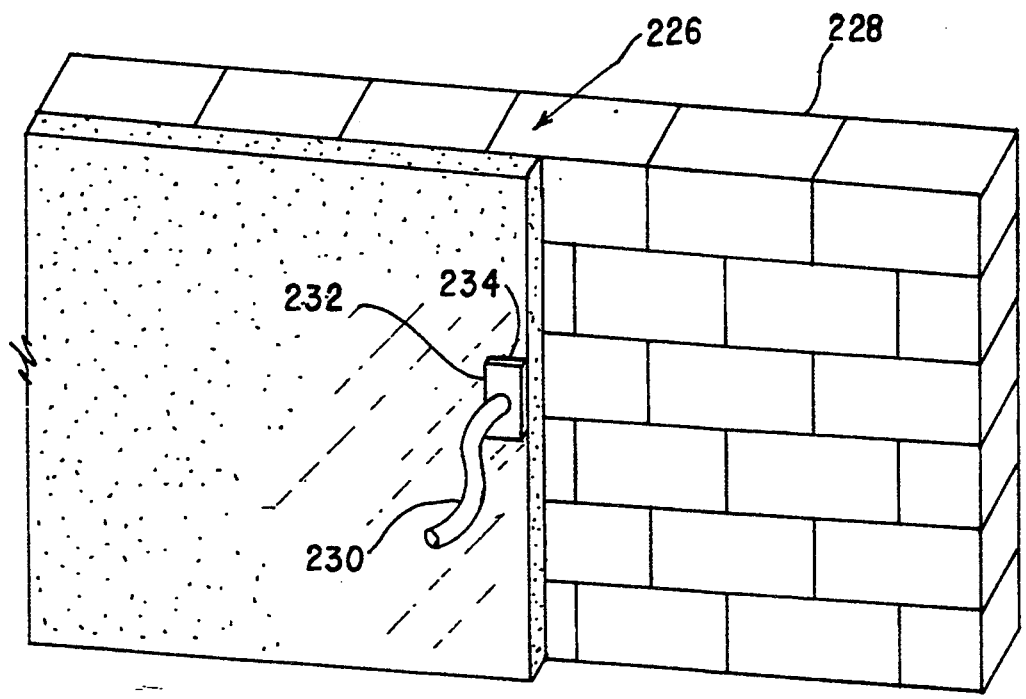
FIG. 18 is a schematic cross-sectional view of the lofted fibers and foamed adhesive insulating mixture being contoured using the second spraying hose equipped with the troweling plate.

Referring to FIGS. 17 and 18, a process to mold the surface of the foamed fiber insulation 226 substantially simultaneously with its application is depicted. In FIG. 17, foamed fiber insulation 226 is sprayed onto a surface 228 by a spraying apparatus 230 mounting a trowel 232. As shown in FIG. 18, when the foamed fiber insulation 226 has reached a desired thickness, the flat metal face 234 of the trowel 232 is moved in a back-and-forth motion to mold the surface of the foamed fiber insulation 226 into a desired shape and texture. The spray of foamed fiber insulation 226 is typically not stopped during molding so that the deposition and molding steps occur substantially simultaneously.

The smooth exterior surface of the cured foamed fiber insulation 226 permits it to be finished in the same manner as a conventional well, e.g., it may be plastered, wallpapered, painted, stuccoed, sprayed with acoustic materials, or left as is. The exterior surface may be molded to produce a flat surface suitable for the attachment of wallboard, such as drywall or paneling, or wallpaper. In addition to the above-described molding techniques, a form having a rigid, flat surface, such as a sheet of particle board or plywood, may be used as a form to provide such a flat surface. The form may be either removed or left on the surface, as desired.

Figure 19:
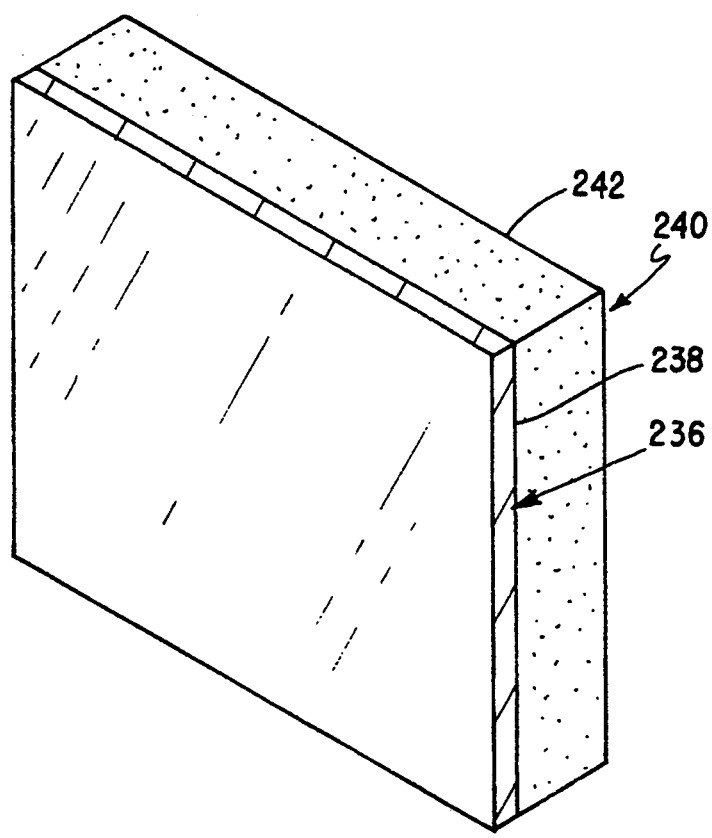
FIG. 19 is a schematic cross-sectional view of the fully cured lofted fibers and foamed adhesive insulating mixture with drywall cemented to its exterior surface.

Referring to FIG. 19, wallboard 236, such as drywall, can be cemented to the exterior surface 238 of the cured layer of foamed fiber insulation 240 adhering to wall 242. Any cement known in the art suitable for use with wallboards may be used. Preferably, the cement used has a different chemical composition from the adhesive used in the foamed fiber insulation 240. The wallboard 236 may be finished as desired after the cement has dried sufficiently. The finishing process is simplified by the avoidance of nail indentations in the wallboard which must typically be finished. Similarly, with respect to exterior walls to which the foamed fiber insulation 240 has been applied, exterior surfaces such as stucco can be applied or exterior structures like aluminum siding can be attached.

Figure 20:
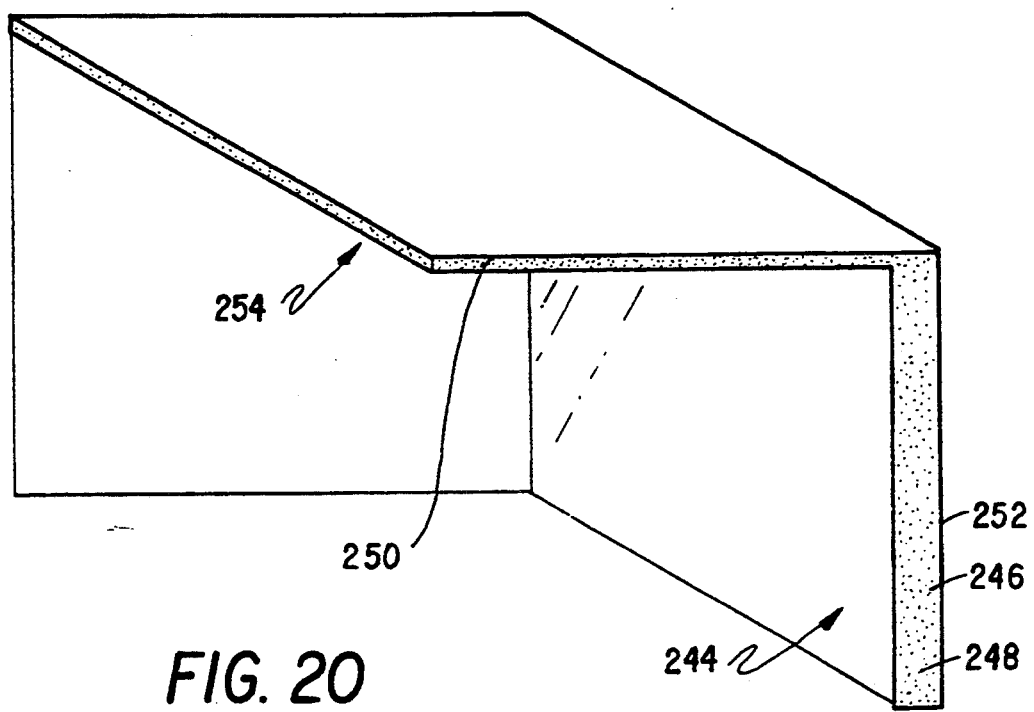
FIG. 20 is a schematic cross-sectional view of the fully cured lofted fibers and foamed adhesive insulating mixture applied to a ceiling and wall.

Referring to FIG. 20, the density and thickness of the foamed fiber insulation 244, 254 may be varied with the type of surface being insulated. The compression and tensile strengths and "R" rating of the layer of foamed fiber insulation 244, 254 are directly related to the density of insulation particles 246 and inversely related to the density of foamed adhesive material 248. In other words, the greater the density of insulation particles 246 and the lower the density of foamed adhesive material 248, the greater the compression and tensile strengths and "R" rating of the layer 244, 254. Accordingly as illustrated by FIG. 20, the insulation layer 244,254 may be less dense in areas requiring less strength and/or a lesser "R" rating, such as ceilings 250, and more dense in areas requiring greater strength and/or a greater "R" rating, such as walls 252, which frequently contact people or heavy objects.

The thickness of the layer of foamed fiber insulation 244, 254 also varies with the type of surface to be insulated. The thicker the layer of foamed fiber insulation 244, 254, the greater the compression and tensile strength and "R" rating of the layer. A layer 244, 254 with a thickness of 0.25 inches has been found suitable in many instances. However, layers of up to six feet have presently been achieved.

The foamed fiber insulation may include a variety of additives to impart desired properties to the insulation. For example, a dye may be added to produce a layer of foamed fiber insulation of a desired color which does not require painting. Fire retardant materials may be added to produce a fire retardant foamed fiber insulation layer. Typically, a fire retardant adhesive is combined with a fire retardant insulating particle to achieve the fire retardant foamed fiber insulation. Known fire retardant adhesives include bentonite based adhesives and sodium silicate based adhesives. Known fire retardant insulating materials include mineral fibers, fiberglass, vermiculite, and perulite (an expanded sodium silicate). Additionally, accelerators can be added to the foamed fiber insulation to speed the transition from the flowable state to the rigid state by increasing the rate at which moisture evaporates from the foamed fiber insulation after application. Suitable accelerators include non-flammable solvents like alcohol.

The foamed binder may also be used for dust suppression on surfaces prior to activities such as painting. To act as a dust suppressant, the amount of insulation particles in the foamed fiber insulation mixture is attenuated to produce foamed fiber insulation with few insulation particles. The mixture is then applied to the desired surface where it encapsulates the dust particles on the surface and provides a clean, smooth surface.

Figure 21:
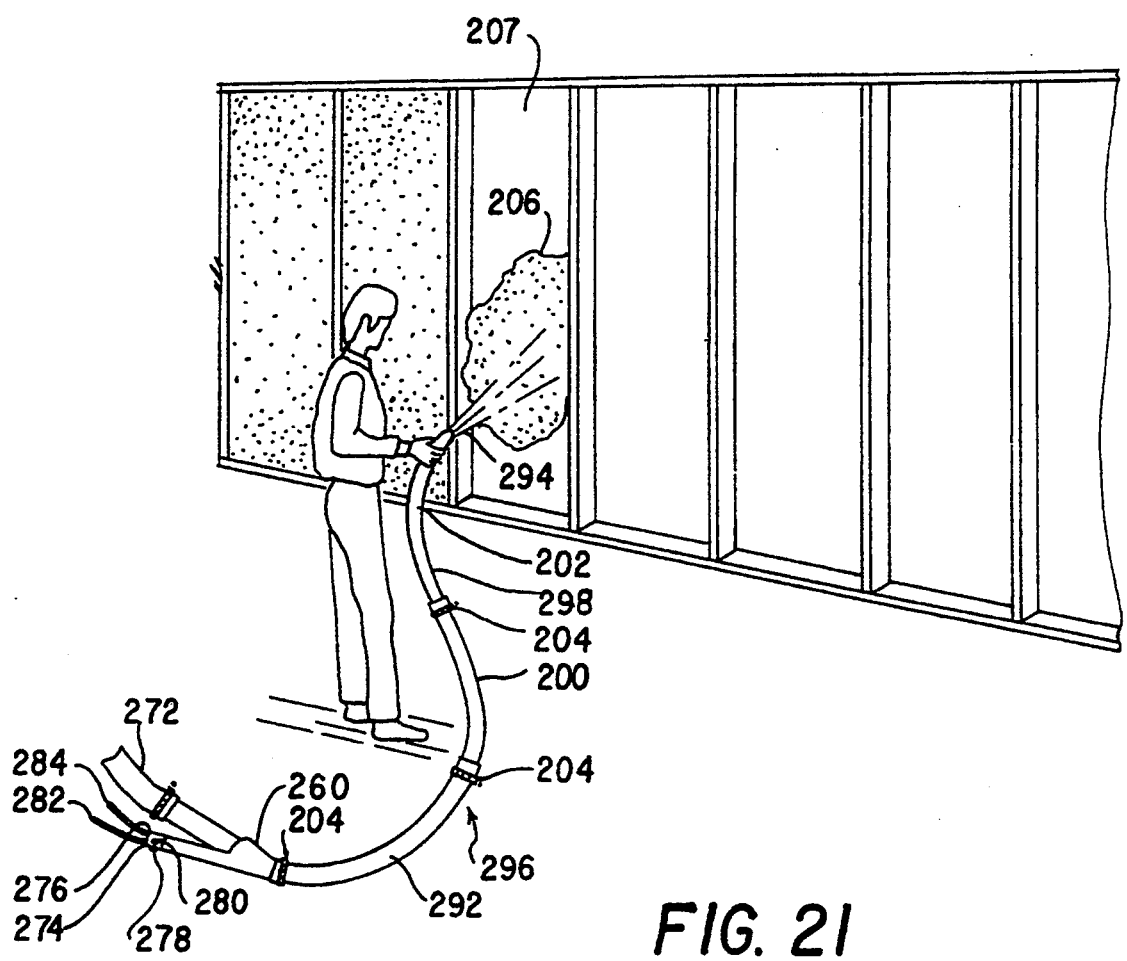
FIG. 21 is a perspective view of a structure illustrating a hose apparatus used to apply foamed insulation particles to a structure.
Figure 22:
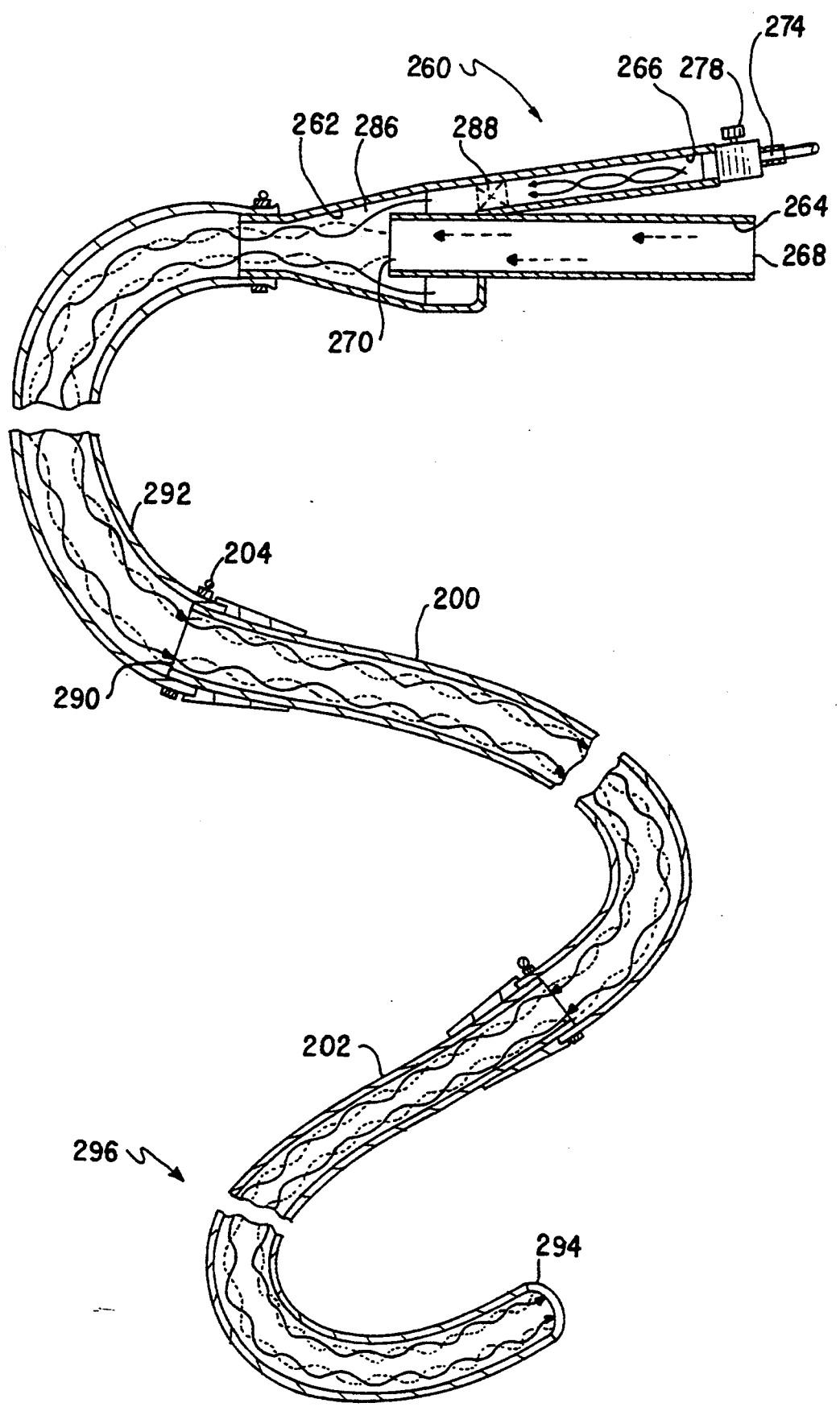
FIG. 22 is a cross-sectional view of the hose apparatus shown in FIG. 21.

An apparatus and method for mixing the foamed adhesive material with lofted fibrous insulation particles and spraying the mixture into a cavity to fill the cavity, or portions thereof such as along a cavity border, with fibrous insulation having a substantially homogeneous density is shown in FIGS. 21 and 22. As used herein, "spray" means to provide a mixture of foamed adhesive material and lofted fibrous insulation at a sufficient velocity to allow the mixture to substantially adhere to a surface while substantially reducing separation of the mixture. The apparatus used for mixing the lofted fibrous insulation and foamed adhesive material is disclosed in U.S. Pat. No. 4,768,710 to Sperber, entitled "Fibrous Blow-In Insulation Having Homogeneous Density."

Referring to FIGS. 21 and 22, a nozzle 260 includes a mixing chamber 262, a first conduit 264, and a second conduit 266. The first conduit 264 has a first entrance port 268 and a first exit port 270. The first exit port 270 communicates with the mixing chamber 262. The first entrance port 268 of the first conduit 264 is preferably connected to a hose or pipe 272 for introduction through the entrance port 268 of fibrous particles as described below. The second conduit 266 has second and third entrance ports 274, 276 controllable by first and second valves 278, 280, respectively. Connected to the second and third entrance ports 274, 276 are feed lines 282, 284 for introduction of foaming agent and adhesive material and pressurized gas, respectively. The second conduit 266 has a second exit port 286 communicating with the mixing chamber 262. In the region of the second conduit 266 near the second exit port 286, the second conduit 266 is expanded to be located outwardly of the first conduit 264, preferably surrounding the first conduit 264 as a collar. The second conduit 266 tapers towards the first conduit 264 at the mixing chamber 262. The second conduit 266 preferably contains one or more baffles or obstacles 288 to assist in foam production. The mixing chamber 262 is attached to a mixing hose or mixing pipe 292 for completing the mixing of the lofted fibers of insulation and foamed material and directing the insulation material. Based on economics, the most preferred mixing hose length is about two feet, though the longer the mixing hose 292, the more uniform the mixture of insulation particles and foamed adhesive materials. The mixing hose or mixing pipe 292 further includes a first ejection port 290.

To spray the mixture of fibrous lofted insulation particles and foamed adhesive material, it is necessary to increase the velocity of the mixture when it is ejected from a second ejection port 294. Since the increase of the velocity of the fibrous lofted insulation particles and/or foamed adhesive material in the first and/or second conduits, respectively, will prevent optimal mixing of the particles and material, the velocity of the particles and material in the first and second conduits must remain at a level below the velocity necessary to cause spraying of the mixture. The spraying assembly 296 therefore increases the velocity of the mixture by decreasing the cross-sectional area of flow.

In a preferred embodiment the spraying assembly 296 consists of two separate interconnected hoses 200 and 202 connected either to each other or the mixing hose 292 by a connecting means 204, such as a clamp and/or duct tape, with each spraying hose having a smaller inner diameter than the preceding hose and no spraying hose having an inner diameter equal to or greater than the inner diameter of the mixing hose 292. In the preferred embodiment, the inner diameter of the first ejection port 290 and mixing hose 292 is approximately 2.5 inches, the first spraying hose 200 is approximately 2 inches and the second spraying hose 202 is approximately 1.50 to approximately 1.75 inches. As shown in FIG. 20, the inner diameters of the hoses are decreased in a step-wise fashion for the reason that the mixture of fibrous lofted insulation particles and foamed adhesive material was observed to separate whenever there is any reduction in the cross-sectional area of flow of the mixture. When the inner diameter was reduced from approximately 2.5 inches to approximately 1.75 inches through the use of one spraying hose, the insulation particles and foamed adhesive material were too dissociated to apply a uniform mixture of the particles and material to the desired surface. When the desired reduction was accomplished in two spraying hoses, the spraying assembly 296 was found to apply a uniform mixture of the particles and material to the desired surface. Based on these observations, it appears that the degree of separation is directly proportional to the degree of reduction. In other words, it appears that the larger the reduction in cross-sectional area of flow, the greater the dissociation of the insulation particles from the foamed adhesive material. The gradual reduction of the cross-sectional area of flow in two stages causes an initial separation of the mixture components, followed by a gradual remixing, followed by a second separation and a second remixing. At the end of the second spraying hose 202, there is sufficient mixture and sufficient velocity to cause the foamed fiber insulation to spray. To insure sufficient remixing of the mixture components following a decrease in cross sectional area, each spraying hose should have a length of at least about one foot, though the longer the hose, the more uniform the mixture of insulation particles and foamed adhesive material. Based on economics, the most preferred spraying hose length is about two feet. An overall hose length of up to 30'-40' has been used in many applications. As will be known and understood by those skilled in the art, the number, inner diameters, and lengths of spraying hoses may vary depending upon the desired velocity and/or desired degree of separation of the mixture components and/or volume of foamed fiber insulation that is to be applied per unit of time (the greater the volume per unit of time, the larger the diameter of the spraying hoses).

The manner of using the nozzle 260 and spraying assembly 296 and of production and placement of insulating material 206 will now be described. A foaming agent and adhesive are introduced through the first line 282 and through the second entrance port 274 into the second conduit 266, with the rate of flow being controlled by the first valve 278. Any of a number of foaming agents well known in the art can be used. Foamable adhesives such as polyvinyl acetate, ethylvinyl acetate, animal glues and the like can also be used. A pressurized gas, such as air, is introduced through the second line 284 and through the third entrance port 276 at a rate controlled by the second valve 280. Inside the second conduit 266, the pressurized air mixes with the foaming agent and adhesive materials to produce a foam and adhesive material which moves through the second conduit 266. The baffle or obstacle 288 can be used to assist in producing foam. The foam and adhesive material in its foamed state moves through the first exit port 286 of the second conduit 266 and into the mixing chamber 262 and then into the mixing hose 292.

Substantially dry, lofted fibrous particles which have been lofted by mixing with pressurized air are introduced through the first entrance port 268 into the first conduit 264. The fibrous material can be any fiber well known in the art including mineral fibers, recycled paper and fiberglass. The lofted fibers and pressurized air move through the first conduit 264 and through the first exit port 270 of the first conduit 264 into the mixing chamber 262 and then into mixing hose 292.

In the mixing chamber 262 and mixing hose 292, the foam and adhesive material in its foamed state substantially mixes with the lofted fibers. The tapered area of the second conduit 266 assists in preventing back flow of mixture into the conduits, particularly the second conduit 266. Such back flow can occur, for example, when the flow of insulation mixture through the nozzle 260 is stopped. If the flow of the mixed fibers and foamed adhesive material were permitted back into the second conduit 266, it would be necessary for the operator to frequently clean out or unplug the conduit 266 whenever flow of the mixture is stopped by the operator for some reason, such as moving the apparatus to a new cavity for filling with the insulation. The proportion in which the components are mixed, and particularly the proportion of liquid foaming material and adhesive material to pressurized gas and other material, is preferably adjusted so that the resulting mixture ejected from the second ejection port 294 has a low moisture content per volume and has the ability to adhere to a desired surface when sprayed.

The mixture of fibers and foam and adhesive material is introduced under pressure from the mixing hose 292 into the first spraying hose 200. As shown in FIG. 20, the mixture components separate when the cross-sectional area of flow is decreased. The mixture components are substantially remixed when they enter the second spraying hose 202 and the cross-sectional area of flow is decreased a second time. As before, the mixture components separate when the cross-sectional area of flow is decreased and are substantially remixed by the time the mixture is sprayed from the second ejection port 294.

As shown in FIG. 21, the mixture of fibers and foamed adhesive material 206 which is sprayed from the second ejection port 294 is directed to and received in an area 207 where insulation is desired. In a typical application, the mixture is directed into the cavity of a typical stud-construction wall 208 whereby the foamed insulation can be made and installed at the construction site. Since the present invention has the ability to spray the mixture of fibers and foamed adhesive material, the mixture may be used to install insulation in any other desired cavity, however oriented, including without limitation ceiling and floor cavities. As depicted in FIG. 14, the foamed adhesive material 210 is used to maintain loft or spreading of the insulation fibers 216 relative to each other. The material 210 maintains such loft or spreading of fibers even when it is impacted by subsequent applications of the mixture ejected from the second ejection port 294 and maintains loft or separation of fibers in spite of the weight of insulation material above.

After the mixture has been placed in the desired area 207 as depicted in FIG. 21, the mixture may be sculpted into any desired shape or texture by, for example, the use of a trowel. The moisture in the mixture dries in the ambient atmosphere, without the necessity for application of heat or other drying procedures. With the drying of the moisture, the material 206 dissipates leaving only the fibrous particles 216 and adhesive which maintained the fibrous particles in a desired, spread state.

Although the present invention has been described with reference to certain embodiments, it should be appreciated that further modifications can be effected within the spirit and scope of the invention.

What is claimed is:

1. A method for insulating and for simultaneously holding batt insulation in place, comprising:

providing a frame assembly including a cavity back wall and border walls that define at least a first cavity, each of said border walls defining a depth and having an outer face with said depth extending from said cavity back wall to said outer face;

supplying a mixture to said first cavity, said mixture including dissipating foam, adhesive and loose insulation particles, said supplying step including supplying more of said mixture adjacent to said border walls and portions of said cavity back wall adjacent to said border walls than is supplied to a volume of said first cavity disposed inwardly of said border walls and said back wall portions; and positioning batt insulation in said first cavity with said batt insulation to be held in said first cavity using said adhesive and with at least a majority of said foam subsequently dissipating, said positioning step including spreading said mixture using said batt insulation to cause some of said mixture adjacent to said border walls to spread into said first cavity volume, said adhesive being used to adhere said batt insulation to said border walls along at least portions of said depth thereof.

2. A method, as claimed in claim 1, wherein:
said supplying step includes locating said mixture substantially only along said first cavity border walls and said portions of said back wall adjacent to said border walls.

3. A method, as claimed in claim 1, wherein:
said supplying step includes underlying some of said batt insulation with said mixture but not underlying all of said batt insulation with said mixture.

4. A method, as claimed in claim 1, wherein:
said positioning step includes holding said batt insulation in said cavity using substantially only said adhesive of said mixture.

5. A method, as claimed in claim 1, wherein:
said frame assembly includes at least a first vertically extending stud having a depth and said supplying step includes providing said mixture along said first stud but less than said depth of said first stud.

6. A method, as claimed in claim 1, wherein:
substantially all of said supplying step is completed before said positioning step.

7. A method, as claimed in claim 1, wherein:
said supplying step comprises spraying said mixture into said cavity.

8. A method, as claimed in claim 1, wherein:
said supplying step includes underlying substantially all of said batt insulation with said mixture.

9. A method, as claimed in claim 8, wherein:
said frame assembly includes at least a first vertically extending stud having a depth, and said supplying step includes underlying substantially all of said batt insulation with a layer of said mixture having a depth, said depth being less than half the depth of said stud.

10. A method, as claimed in claim 1, wherein:
said foam includes said adhesive.

11. A method, as claimed in claim 1, wherein:
said supplying step includes maintaining portions of said cavity back wall free of said mixture and said positioning step includes having portions of said batt insulation directly contact said cavity back wall without said mixture being disposed between said portions of said batt insulation and said cavity back wall.

12. A method for providing insulation for a cavity defined by frame assembly and having a cavity volume, comprising the steps of:
providing a frame assembly having vertically extending walls including a back wall with a cavity volume being defined by said vertically extending walls and said cavity volume having a length, a width and a depth;

supplying a mixture to said cavity volume, said mixture comprising dissipating foam, adhesive, and loose insulation material, said supplying step including supplying a said mixture in contact with said vertically extending walls to fill portions of said cavity volume, said supplying step including having said mixture occupy no greater than ¼ of said cavity volume;

positioning batt insulation in said cavity volume prior to substantial dissipation of said foam, said positioning step including spreading said mixture using said batt insulation; and allowing said foam to dissipate and said adhesive to dry such that said adhesive bonds pieces of loose insulation material together and holds said batt insulation in said cavity volume.

13. A method as recited in claim 12, wherein said supplying step includes:
locating said mixture substantially only along the border of said cavity.

14. A method as recited in claim 12, wherein said supplying step includes:
spraying said mixture into said cavity.

15. A method as recited in claim 12, wherein said loose insulation material comprises fly ash particles.

16. A method, as claimed in claim 12, wherein:
said foam includes said adhesive.

17. A method, as claimed in claim 12, wherein:
said supplying step includes maintaining portions of said cavity volume free of said mixture and said positioning step includes having portions of said back wall free of said mixture between said portions of said back wall and said batt insulation.

18. A method for providing insulation, comprising:
providing a frame assembly having vertically extending walls including a back wall and border walls with a cavity volume being defined by said vertically extending walls, each of said border walls defining a depth and having an outer face with said depth extending from said back wall to said outer face;

supplying a mixture to said cavity volume in contact with said vertically extending walls to fill portions of said cavity volume, said supplying step including having said mixture occupy no greater than ¼ of said cavity volume;

positioning batt insulation in said cavity volume prior to substantial dissipation of said foam; and allowing said foam to dissipate and said adhesive to dry such that said adhesive bonds pieces of loose insulation together and holds said insulation in said cavity volume and wherein said adhesive is used to adhere said batt insulation to said border walls along at least portions of said depth thereof.

19. A method, as claimed in claim 18, wherein:
said foam includes said adhesive.

20. A method, as claimed in claim 18, wherein:
said supplying step includes maintaining portions of said back wall free of said mixture and said positioning step includes directly contacting portions of said batt insulation with said back wall without said mixture being disposed between said portions of said batt insulation and said back wall.

* * * * *